No. 780,705. PATENTED JAN. 24, 1905.
F. CHARRON & L. GIRARDOT.
REGULATING DEVICE FOR PETROLEUM MOTORS.
APPLICATION FILED MAR. 22, 1902.
2 SHEETS—SHEET 1.
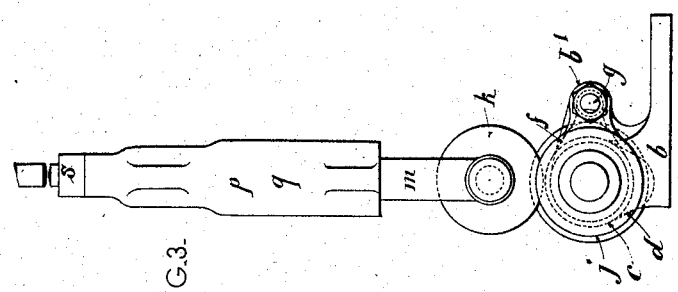
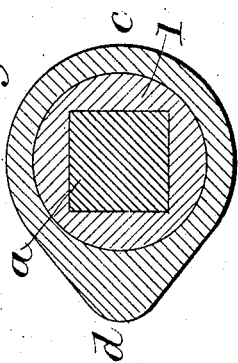
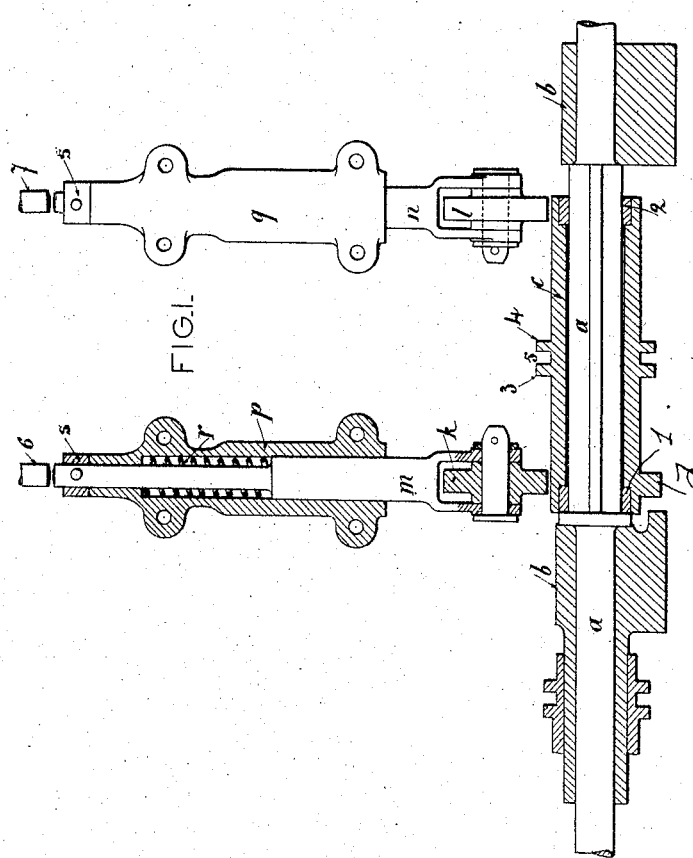
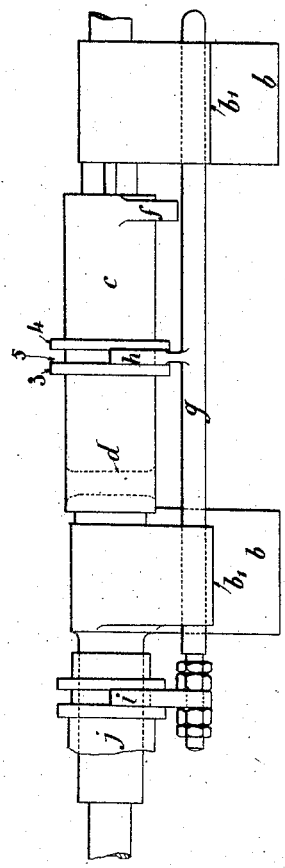
Witnesses:
B. Patterson
E. Blohm
Inventors:
F. Charron and
L. Girardot
By Clark Deemer &c
Attorneys

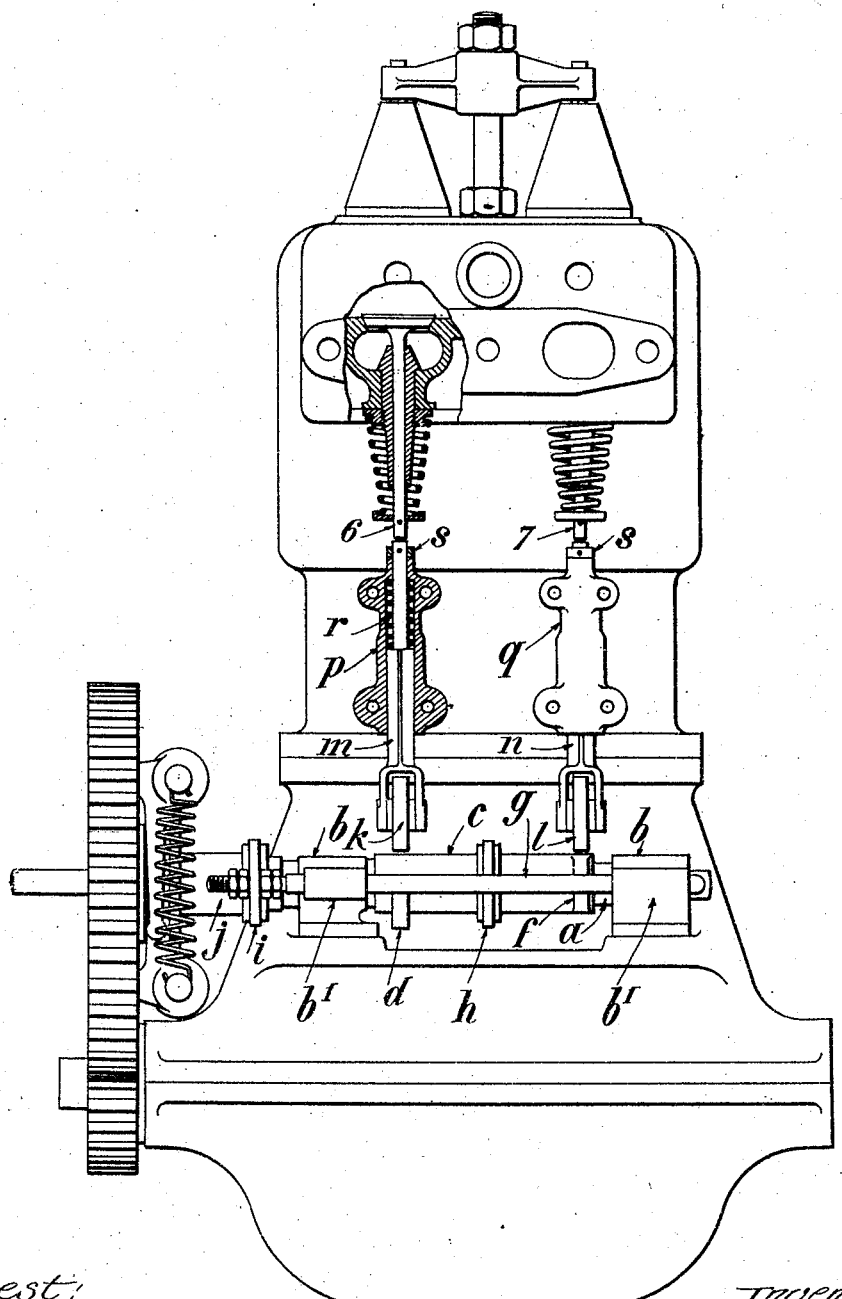

No. 780,705. Patented January 24, 1905.

UNITED STATES PATENT OFFICE.

FERDINAND CHARRON AND LÉONCE GIRARDOT, OF PARIS, FRANCE.

REGULATING DEVICE FOR PETROLEUM-MOTORS.

SPECIFICATION forming part of Letters Patent No. 780,705, dated January 24, 1905.

Application filed March 22, 1902. Serial No. 99,500.

*To all whom it may concern:*

Be it known that we, FERDINAND CHARRON and LÉONCE GIRARDOT, citizens of the Republic of France, residing at No. 45 Avenue de la Grande Armée, Paris, in the Republic of France, have invented certain new and useful Improvements in Regulating Devices for Petroleum-Motors, of which the following is a specification.

This invention relates to regulators for petroleum-motors.

The invention has for its object to produce and combine means whereby the speed of a petroleum-motor may be automatically regulated.

The invention also has for its object to provide mechanism whereby the escape-valves of such motor may automatically be opened after each explosion when the motor is running at normal speed.

The invention also has for its object to add devices to the said mechanism, so that when the motion of the said motor exceeds normal speed the said escape-valves may be closed and the said motion reduced to normal speed.

The invention has also divers other objects, which will be more fully hereinafter set forth.

The nature of the invention consists in the combination of reciprocating sliding rods partly actuated by springs, with other mechanism, also partly actuating said rods, whereby the said escape-valves may be opened as required.

The nature of the invention also consists in the combination, with sliding rods carrying friction-rollers, of means whereby such rods are moved to open said valves as required.

The nature of the invention also consists in the combination, with sliding rods carrying friction-rollers, of revolving cams engaging said rollers, and thereby actuating said rods to open said valves as required.

The nature of the invention also consists in the combination, with sliding rods carrying friction-rollers and partly actuated by springs, of revolving cams engaging said rollers, and thereby also partly actuating said rods to open said valves as required, a revoluble shaft whereon said cams are mounted, and means whereby said cams are moved on said shaft so as to disengage them from said rollers and allow the said valves to remain closed as required.

The invention also consists in divers other features, which will be fully understood from the following general description and the annexed drawings and will be subsequently pointed out in the claim.

In the annexed drawings, which are hereby made a part of this specification, Figure 1 is a side view of our invention, partly in section. Fig. 2 is a side view of the two to one way shaft with its cam-sleeve and cams. Fig. 3 is an end view of one side of our invention. Fig. 4 is a sectional view taken on the line passing through the cam $d$ of Fig. 2. Fig. 5 is a view showing the device in connection with the escape-valves and the speed-regulator.

In the said drawings, $a$ designates the two to one way shaft. This is journaled in bearings $b$, which are supported by the frame of the motor to which the device is attached. The middle portion of this shaft between said bearings is square. Upon this square portion is mounted the sleeve $c$, which is not of sufficient length to extend through the entire distance between the bearings $b$. This sleeve and the shaft $a$ are illustrated in section in Fig. 4. This sleeve is so arranged that while it is carried in rotation by the shaft $a$ it is also capable of being slipped endwise thereon. To insure the easy shifting and true guiding of the sleeve and also to reduce the friction to a minimum, the two rings 1 and 2 are fastened one in each end of the sleeve. These have square central openings adapted to fit on the said square part of the shaft $a$.

On the exterior of the sleeve $c$, one at each end, are the cams $d$ and $f$, integral with the sleeve and arranged so that their longer axes will be at right angles to each other. In the middle portion of said sleeve are two annular collars 3 and 4, between which there is an annular recess 5.

Parallel to the shaft $a$ is a rod $g$, free to slide endwise in bosses cast integral with the bearings $b$. This rod carries a fork $h$, which engages the sleeve $c$ in the annular recess 5. It also carries at one end an adjustable fork $i$, which engages the annular recess of the sleeve $j$ of a centrifugal-force regulator. This regulator is shown in the drawings; but it may be of any available construction, so that it has an adaptable sleeve engaging the end of the shaft $a$. The fork $i$ is secured in place with nuts, as illustrated.

$p$ and $q$ designate vertical bearings which are to rest on proper supports in the frame of the machine. In these guides slide the rods $m$ and $n$. The springs $r$ partly actuate these rods. These rods also carry at their lower ends the friction-rollers $k$ and $l$, which engage the cams $d$ and $f$. These rods $m$ and $n$ are located directly under the stems of the escape-valves of the motor, so as to engage them, as hereinafter set forth.

It will now be seen that as long as the motor maintains its normal rate of speed the cams $d$ and $f$ alternately raising the rods $m$ and $n$ will cause them to alternately engage the stems of the escape-valves of the motor, and thereby alternately open the valves, each one in proper time for the escape of the products of explosion; but if the motor should attain too great speed the sleeve $j$ of the regulator will be moved endwise on the shaft $a$, and, carrying with it the fork $i$, the rod $g$, and the fork $h$, will also cause the sleeve $c$ to slip endwise on the shaft $a$. This will move the cams $d$ and $f$ out of engagement with the rollers $k$ and $l$. The rods $m$ and $n$ will then cease to move, and the escape-valves of the motor will remain closed until the motion of the motor decreases to normal speed. Then the parts of the mechanism returning to their normal position the machine will perform its normal functions at its normal speed.

We do not, however, confine ourselves strictly to the construction and arrangement herein set forth, for it is evident that under the scope and spirit of our invention we may make divers slight variations without departing therefrom.

Having now fully described what our invention is and how it is constructed and used, what we claim, and desire to secure by Letters Patent, is—

In a regulator for petroleum-motors, the combination with the sliding valve-actuating rods, guides therefor, and friction-rollers carried by the rods, of a shaft, a sleeve slidably mounted thereon, having a cam on each end thereof, said cams engaging with the rods, rings on said sleeve, a rod $g$ arranged parallel to said shaft, a fork integral with said rod and engaging with the sleeve between the rings thereon, a second sleeve $j$ slidably mounted on the shaft, a centrifugal governor for moving said sleeve and a second fork adjustably secured to the rod $g$ and connected to the sleeve $j$ whereby on the movement of the sleeve $j$ the cams will be disengaged from the friction-rollers on the rods.

In witness whereof we have hereunto set our hands in presence of two witnesses.

FERDINAND CHARRON.
LÉONCE GIRARDOT.

Witnesses:
ANTOINE LAVOIX,
EDWARD P. MACLEAN.